United States Patent
Hacikyan

(10) Patent No.: US 10,654,122 B2
(45) Date of Patent: May 19, 2020

(54) GAS DIFFUSING WATER DEGRADABLE WELDING PURGE DAM

(71) Applicant: Michael Hacikyan, Naples, FL (US)

(72) Inventor: Michael Hacikyan, Naples, FL (US)

( * ) Notice: Subject to any disclaimer, the term of this patent is extended or adjusted under 35 U.S.C. 154(b) by 1068 days.

(21) Appl. No.: 15/017,358

(22) Filed: Feb. 5, 2016

(65) Prior Publication Data

US 2017/0225258 A1    Aug. 10, 2017

(51) Int. Cl.
B23K 9/32    (2006.01)

(52) U.S. Cl.
CPC .................................. B23K 9/326 (2013.01)

(58) Field of Classification Search
CPC ...................................................... B23K 9/326
USPC .......... 228/219, 42, 60, 50, 57, 215, 8, 44.5, 228/49.3, 222, 46, 44, 4, 6; 428/84, 192, 428/66.3; 219/60 A, 137 R, 74, 651, 136, 219/6 A, 6 R, 61, 158, 72, 121, 161, 8.5; 269/287, 288, 2
See application file for complete search history.

(56) References Cited

U.S. PATENT DOCUMENTS

| | | |
|---|---|---|
| 2,100,165 A | 11/1937 | Holmberg et al. |
| 2,918,563 A | 12/1959 | Ternisien et al. |
| 3,095,844 A | 7/1963 | Thielsch |
| 3,428,258 A | 2/1969 | Duggan |
| 3,537,543 A | 11/1970 | Gibel |
| 3,724,273 A | 4/1973 | Awrey |
| 3,736,400 A | 5/1973 | Spiegel et al. |
| 3,875,364 A | 4/1975 | Boyett |
| 3,994,429 A | 11/1976 | Halleneck et al. |
| 4,096,372 A | 6/1978 | Hallenbeck |

(Continued)

FOREIGN PATENT DOCUMENTS

| | | | |
|---|---|---|---|
| GB | 2201623 A | * 9/1988 | ............. B23K 9/326 |
| GB | 2201623 A | 9/1988 | |

(Continued)

OTHER PUBLICATIONS arczone.com, "Purge Bladders Save Time and Money", 2006, 2 pages.

(Continued)

*Primary Examiner* — Dana Ross
*Assistant Examiner* — Ket D Dang
(74) *Attorney, Agent, or Firm* — Walter W. Duft

(57) ABSTRACT

A gas-diffusing water-degradable welding purge dam apparatus for purging a weld zone of a pipe assembly having first and second pipes with respective first and second pipe ends to be welded together at a root gap. The purge dam apparatus includes a first air flow blocking member, a second air flow blocking member, and an interconnecting member interconnecting the first and second air flow blocking members. The interconnecting member has a hollow purge gas-receiving interior and a gas-diffusing sidewall that allows a pressurized purge gas in the gas-receiving interior to pass through the sidewall and exit therefrom in a diffused state into a weld zone external to the interconnecting member. An external purge gas entry port in the purge dam apparatus in fluid communication with the gas-receiving interior. The purge dam apparatus includes one or more water degradable materials so it can be flushed from the pipe assembly following welding.

21 Claims, 9 Drawing Sheets

(56) References Cited

U.S. PATENT DOCUMENTS

| | | | |
|---|---|---|---|
| 4,101,067 A * | 7/1978 | Sloan | B23K 31/027 |
| | | | 219/136 |
| 4,114,655 A | 9/1978 | Bloker | |
| 4,230,279 A | 10/1980 | Forsberg | |
| 4,300,034 A | 11/1981 | Schneider et al. | |
| 4,415,114 A | 11/1983 | Hallenbeck | |
| 4,454,405 A | 6/1984 | Riley | |
| 4,492,557 A | 1/1985 | Ray et al. | |
| 4,599,505 A | 7/1986 | Lukens et al. | |
| 4,657,186 A | 4/1987 | Shapiro | |
| 4,674,772 A | 6/1987 | Lycan | |
| 4,812,611 A | 3/1989 | Carleton | |
| 4,866,236 A | 9/1989 | DeNale et al. | |
| 4,875,615 A | 10/1989 | Savard | |
| 4,916,281 A | 4/1990 | Flasche et al. | |
| 4,956,537 A | 9/1990 | Schnorrer | |
| 5,100,043 A | 3/1992 | Hallenbeck | |
| 5,187,343 A * | 2/1993 | Edwards | B23K 9/325 |
| | | | 138/90 |
| 5,235,152 A | 8/1993 | Jankus | |
| 5,242,119 A | 9/1993 | Jariyasunant | |
| 5,361,972 A | 11/1994 | Barker | |
| 5,388,753 A | 2/1995 | Bjorkman, Jr. | |
| 5,390,846 A | 2/1995 | Thode | |
| 5,484,973 A * | 1/1996 | Gittens | B23K 9/162 |
| | | | 219/61 |
| 5,556,559 A | 9/1996 | Bjorkman et al. | |
| 5,583,305 A | 12/1996 | Hirsch et al. | |
| 5,601,225 A | 2/1997 | Wood et al. | |
| 5,669,547 A | 9/1997 | Spring | |
| 5,785,235 A | 7/1998 | Beatty | |
| 5,820,027 A | 10/1998 | Szczurek | |
| 6,127,656 A | 10/2000 | Kilmer et al. | |
| 6,299,607 B1 | 10/2001 | Osborn, III et al. | |
| 6,525,288 B2 | 2/2003 | Rehrig | |
| 6,761,304 B2 | 7/2004 | Ruszowski | |
| 7,112,258 B2 | 9/2006 | Klerelid et al. | |
| 7,112,358 B1 | 9/2006 | Hacikyan | |
| 7,632,556 B1 | 12/2009 | Hacikyan | |
| 8,061,388 B1 | 11/2011 | O'Brien et al. | |
| 8,292,161 B2 | 10/2012 | Hacikyan | |
| 8,616,432 B1 * | 12/2013 | Hacikyan | B23K 9/0061 |
| | | | 228/42 |
| 8,647,731 B2 | 2/2014 | Hacikyan | |
| 2002/0060236 A1 * | 5/2002 | Jankus | B23B 31/4066 |
| | | | 228/44.5 |
| 2004/0022676 A1 | 2/2004 | Hamilton et al. | |
| 2005/0072809 A1 | 4/2005 | Pantelleria et al. | |
| 2006/0068142 A1 | 3/2006 | Hacikyan | |
| 2008/0251132 A1 | 10/2008 | Bentley et al. | |
| 2011/0151166 A1 | 6/2011 | Hacikyan | |
| 2011/0210112 A1 | 9/2011 | Boatner, Jr. | |
| 2012/0125600 A1 | 5/2012 | Smith | |
| 2013/0284297 A1 | 10/2013 | Hacikyan | |
| 2014/0117068 A1 | 5/2014 | Hacikyan | |
| 2014/0326779 A1 | 11/2014 | Hacikyan | |
| 2015/0083785 A1 * | 3/2015 | Park | B23K 9/326 |
| | | | 228/33 |

FOREIGN PATENT DOCUMENTS

| | | |
|---|---|---|
| GB | 288562 A | 10/1995 |
| GB | 2327480 A | 1/1999 |
| JP | 05-245633 A | 9/1993 |
| JP | 09-010933 A | 9/1997 |
| JP | 2003-266176 A | 9/2003 |
| JP | 2004105994 A * | 4/2004 |
| JP | 2004105994 A | 4/2004 |
| JP | 2010-149164 A | 7/2010 |
| KR | 06-23685 | 3/1994 |
| KR | 20-0159923 | 11/1999 |
| KR | 20-0179895 | 4/2000 |

OTHER PUBLICATIONS

Weldwide Solutions, "Tandem Ring Purge System", at least as early as Apr. 27, 2012, 3 pages.
Huntingdon Fusion Technologies Limited, "ARGWELD Inflatable Pipe Purging System", Jan. 12, 2008, 2 pages.
Huntingdon Fusion Technologies Limited, "ARGWELD Single Exhaust Pipe Weld Purging Systems 2-6 Inch Pipework", Mar. 15, 2011, 2 pages.
Sumner Manufacturing Co., Inc., "Inflatable Weld Purge System", at least as early as Apr. 27, 2012, 2 pages.
Weldwide Solutions, "Inflatable Purge Systems", at least as early as Jan. 16, 2012, 4 pages.
Safety Main Stopper Co., Inc., "Inflatable Purge Dams", at least as early as Jan. 16, 2012, 2 pages.
Aquasol Corporation, "Purge Bladder: I-Purge Inflatable Purge Dam System", 2010, 6 pages.
AB Paper Co., "Shur-Purge", Jan. 1, 1997, 5 pages.
Intercon, "Water-Soluble Purge Paper", Oct. 1, 2002, 5 pages.
Gilbreth, "Dissolvo", 2001, 8 pages.

* cited by examiner

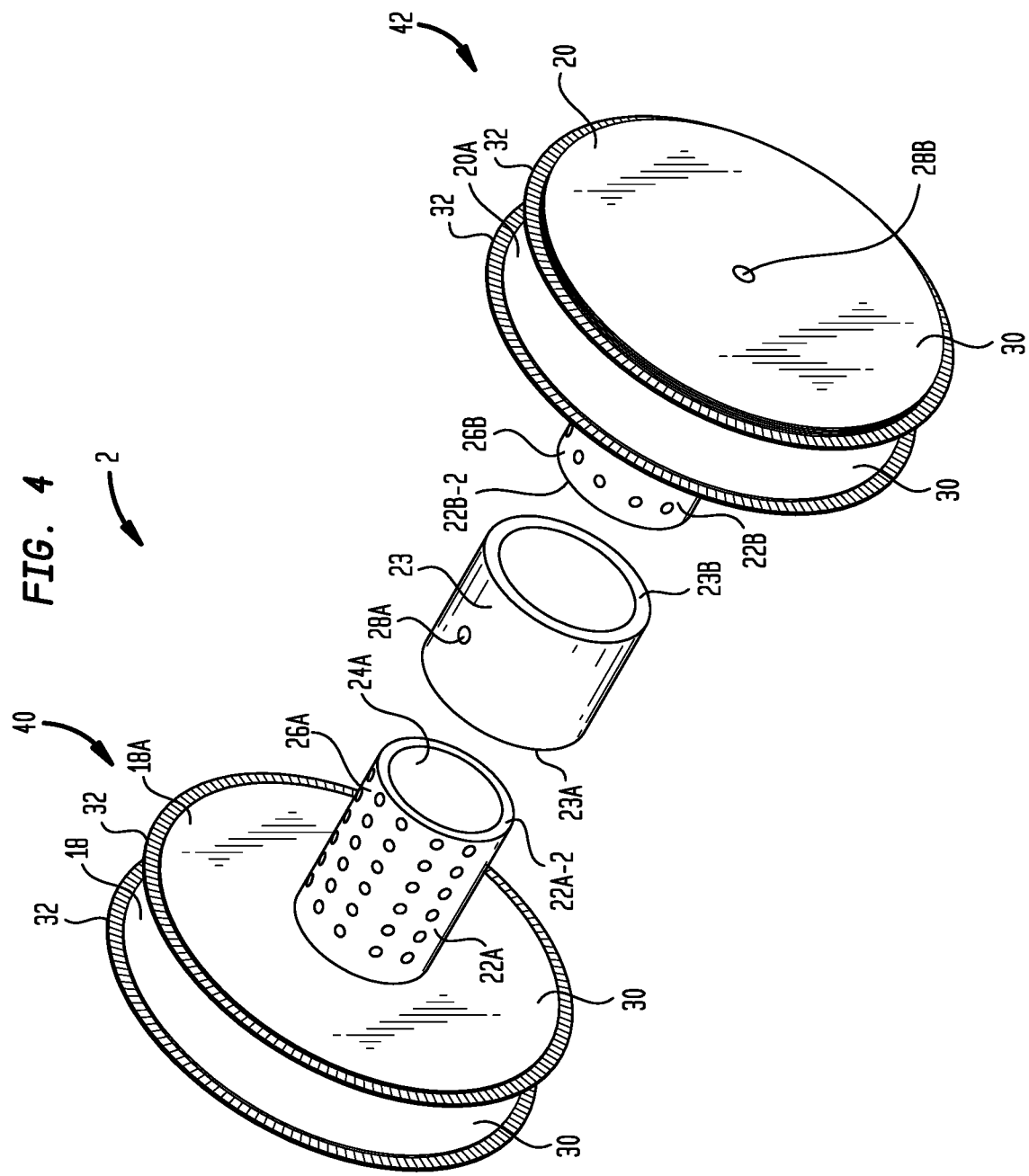

GAS DIFFUSING WATER DEGRADABLE WELDING PURGE DAM

BACKGROUND

1. Field

The present disclosure relates generally to inert gas welding. More particularly, the invention is directed to purge dams for retaining purge gas around a weld zone.

2. Description of the Prior Art

By way of background, inert gas welding is a species of arc welding in which the molten weld pool is shielded from atmospheric contamination and oxidation by bathing it with an inert gas, such as Argon, or a mixture of Helium and Argon. Popular examples of inert gas welding include TIG (Tungsten Inert Gas) welding and MIG (Metal Inert Gas) welding.

When welding together pipes and other enclosed structures using inert gas welding, it is important to purge the interior of the pipe or structure in the vicinity of the weld zone to prevent corrosion and the formation of oxides on the interior side of the weld pool. Purge dams are conventionally used for this purpose. For example, when butt-welding the ends of two pipe sections to form a consolidated pipe run, two purge dam structures are placed in the pipes, one in each pipe on either side of the weld zone. The inert purge gas can then be introduced into the area between the dams. During initial purging prior to welding, the introduction of inert gas into the weld zone displaces the ambient air therein until the oxygen content is reduced to an acceptably low level (as determined by an oxygen monitor). Following initial purging, the flow of inert gas is continued to maintain a pressure differential that prevents oxygen from re-entering the weld zone during welding.

Water degradable purge dams have been proposed that are made from water degradable paper. The advantage of water degradable paper purge dams is that they can be placed in close proximity to a weld zone, and then removed following welding by dissolving or otherwise degrading them with water introduced through the pipe. Insofar as pipe systems typically undergo hydrostatic pressure testing or flushing with water prior to use, water soluble purge paper can be used in many cases without any additional processing steps following welding.

When welding together pipe sections, inert gas is typically introduced into the weld zone via a purge gas dispensing tip that is inserted through the welding root gap. Alternatively, the purge gas dispensing tip can be inserted through a small hole in one of the purge dams. A disadvantage of these techniques is that the inert gas creates turbulence in the weld zone as it is discharged under from the dispensing tip under pressure. During the initial purge operation, this causes the purge gas to mix with the ambient air initially present in the weld zone, thereby increasing the time required to reduce the oxygen content of the weld zone to the desired level. Following initial purging, inert gas turbulence can result in instability of the welding arc as the weld is being formed.

Applicant submits that there is presently a need for improvement in the construction of water-degradable purge dams. What is required in particular is a degradable purge dam apparatus that reduces inert gas turbulence in a weld zone.

SUMMARY

A gas-diffusing water-degradable welding purge dam apparatus for purging a weld zone of a pipe assembly having first and second pipes with respective first and second pipe ends to be welded together at a root gap. The purge dam apparatus includes a first air flow blocking member, a second air flow blocking member, and an interconnecting member interconnecting the first and second air flow blocking members. The interconnecting member has a hollow purge gas-receiving interior and a gas-diffusing sidewall that allows a pressurized purge gas in the gas-receiving interior to pass through the sidewall and exit therefrom in a diffused state to a weld zone area external to the interconnecting member. An external purge gas entry port in the purge dam apparatus is in fluid communication with the gas-receiving interior.

The purge dam apparatus is installable in the pipe assembly such that: (1) the first air flow blocking member is arranged inside the first pipe end, the second air flow blocking member is arranged inside the second pipe end, and the interconnecting member spans the root gap, (2) the air flow blocking members respectively engage inside walls of the first and second pipe ends in order to retain a purge gas in the weld zone and to prevent air from entering the weld zone from the first and second pipes, and (3) the external gas entry port is accessible to receive a purge gas dispensing tip that delivers a purge gas into the gas-receiving interior for passage through the gas diffusing sidewall and into the weld zone in a diffused state. The purge dam apparatus includes one or more water degradable materials so that it can be flushed from the pipe assembly following welding.

In an embodiment, the gas-diffusing sidewall may include gas-permeable apertures of any shape, size and number.

In an embodiment, the gas-permeable apertures may be arranged in defined pattern.

In an embodiment, the defined pattern may include the gas-permeable apertures being arranged to allow the purge gas to exit from the interconnecting member in one or more desired directions.

In an embodiment, the interconnecting member is generally tubular and the gas-permeable apertures are arranged to allow the purge gas to exit from the interconnecting member within a prescribed circumferential angular extent of an exterior surface of the interconnecting member.

In an embodiment, the interconnecting member is generally tubular and the gas-permeable apertures are arranged in circumferential arrays on the interconnecting member.

In an embodiment, the external purge gas entry port is located on the interconnecting member or on one of the first or second blocking members.

In an embodiment, the purge dam apparatus includes: (1) a first purge dam subassembly that includes the first blocking member and a first conduit that provides a first portion of the interconnecting member, the first conduit having a gas-receiving interior, a closed end proximate to the first blocking member and an open end disposed distally from the first blocking member, (2) a second purge dam subassembly that includes the second blocking member and a second conduit that provides a second portion of the interconnecting member, the second conduit having a gas-receiving interior, a closed end proximate to the second blocking member and an open end disposed distally from the second blocking member, (3) a third conduit that provides a third portion of the interconnecting member and has a first open end interconnectable with the open end of the first conduit and a second open end interconnectable with the open end of the second conduit, and (4) one or more of the first, second and third conduits having gas diffusing sidewalls that allow a pressurized purge gas in the gas-receiving interiors of the first, second or third conduits to pass through the sidewalls and exit therefrom in a diffused state to a weld zone area external to the interconnecting member.

In an embodiment, the external gas entry port is accessible to receive a purge gas dispensing tip that delivers a purge gas into the gas-receiving interiors of the first, second and third conduits for passage through the gas diffusing sidewalls and into the weld zone in a diffused state.

In an embodiment, the first, second and third conduits are configured to allow a spacing between the first and second purge dam subassemblies to be adjusted during installation of the welding purge dam apparatus in said pipe assembly.

In an embodiment, the third conduit comprises a ceramic heat shield.

In another aspect, a method for using the disclosed purge dam apparatus is provided.

In a further aspect, a weld zone purging installation is provided that includes the disclosed purge dam apparatus installed in a pipe assembly.

BRIEF DESCRIPTION OF THE DRAWINGS

The foregoing and other features and advantages will be apparent from the following more particular description of example embodiments, as illustrated in the accompanying Drawings, in which:

FIG. 4 is an exploded perspective view showing example components of the purge dam apparatus of FIG. 1;

DETAILED DESCRIPTION OF EXAMPLE EMBODIMENTS

Figure 1:
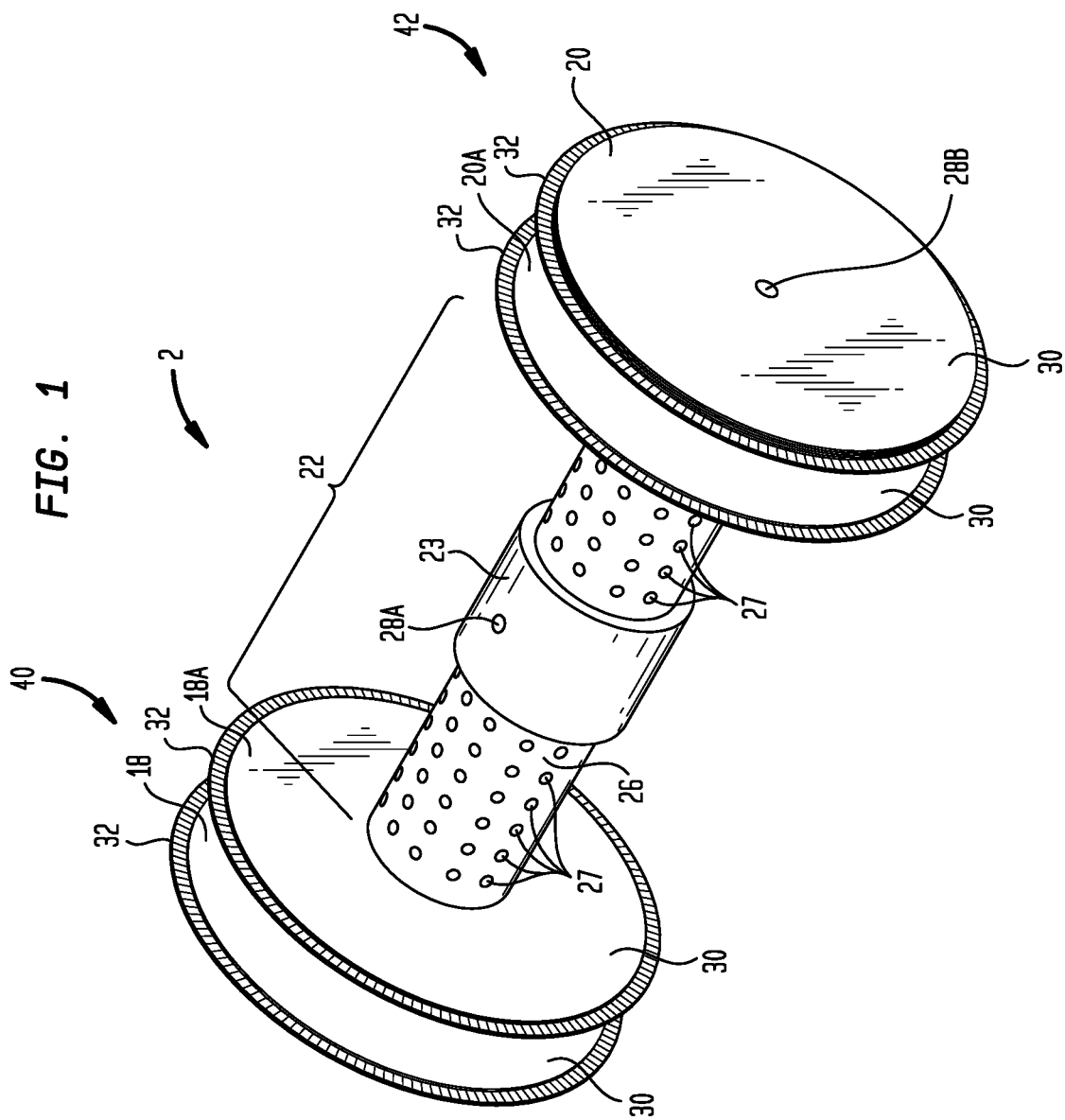
FIG. 1 is a perspective view showing a gas-diffusing water-degradable purge dam apparatus constructed in accordance with an embodiment with the present disclosure.
Figure 2:
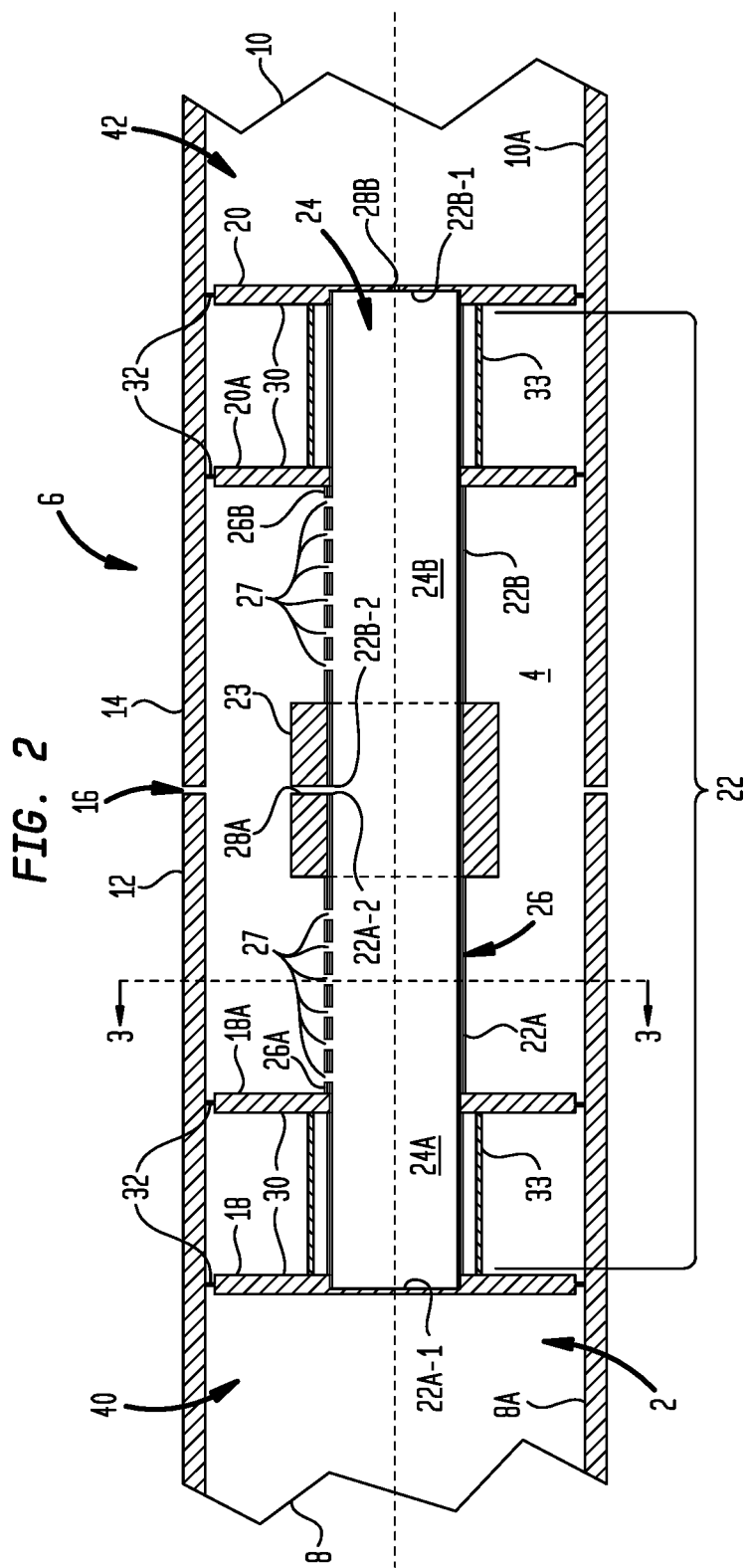
FIG. 2 is a cross-sectional centerline view of the purge dam apparatus of FIG. 1 following installation in a pipe assembly to define a weld zone that is ready for purging.

Turning now to the drawing figures, which are not necessarily to scale, like reference numbers are used to represent like elements in all of the several views. FIGS. 1 and 2 illustrate an example gas-diffusing water-degradable purge dam apparatus 2 representing one possible embodiment of the disclosed subject matter. As best shown in FIG. 2, the purge dam apparatus 2 is adapted for purging a weld zone 4 of a pipe assembly 6 that includes a first left-side pipe 8 and second right-side pipe 10. The first and second pipes 8 and 10 have respective first and second pipe ends 12 and 14 to be butt-welded together at a root gap 16.

Some or all of the structural components of the purge dam apparatus 2 can be made from various water degradable materials. Useful properties of such water degradable materials may include the ability to (1) provide low (or zero) air permeability for critical welding applications, (2) provide sufficient strength to withstand both purge gas pressure and bidirectional air flow pressures within the pipes 8 and 10, (3) allow the purge dam components to be easily formed and manipulated from flat sheet stock into their final shapes, and (4) degrade under hydrostatic pressure testing or flushing of the pipe structure with water or other aqueous liquids to facilitate purge dam removal following welding.

Example water degradable materials include, but are not limited to, water degradable paper or board, a water degradable polymer, or a combination of water degradable paper or board and a water degradable polymer. A water-degradable ceramic material may be used for at least one component of the purge dam apparatus 2, namely, a heat shield to be described in more detail below. Suitable water degradable paper and board materials are available from Aquasol Corporation of North Tonawanda, N.Y. under the trademark Aquasol®. The Aquasol® brand paper and board products are water soluble and made of Sodium Carboxy Methyl cellulose and wooden pulp that dissolves rapidly and completely in most liquids, including water. A suitable water degradable polymer is polyvinyl alcohol (PVOH), which may be manufactured in film form or as a molded three-dimensional structure. Various water-degradable ceramic compositions may be used for the water-degradable ceramic material.

For components made from water degradable paper, board, polymer, or a combination of such materials, one or more layers of the selected material may be fabricated into water degradable sheets of varying thickness. The sheet thicknesses may be selected according to desired strength and flexibility requirements. The water degradable sheets may cut into any desired shape (prior to or after lamination) that is useful for purge dam formation, including but not limited to tubular shapes and planar circular shapes, as will now be described. A suitable water degradable adhesive may be used to combine such components to form the completed purge dam apparatus 2.

In the illustrated embodiment of FIGS. 1 and 2, the purge dam apparatus 2 includes a first primary air flow blocking member 18, a second primary air flow blocking member 20, and an interconnecting member 22 interconnecting the first and second air flow blocking members. As an option, first and second secondary air flow blocking members 18A and 20A may be respectively provided in spaced inboard relationship to the primary airflow blocking members 18 and 20. The secondary air flow blocking members 18A and 20A may be used to increase the purge gas retaining ability of the purge dam apparatus 2, and to help stabilize the position of the purge dam apparatus during welding operations. The number of secondary air flow blocking members located inboard of each primary blocking member 18 and 20 is a matter of design choice. Although not shown, additional blocking members could be placed outboard of the primary blocking members 18 and 20.

The interconnecting member 22 may have an elongated generally tubular configuration, with a central radially enlarged portion being formed due to the presence of a water degradable ceramic heat shield 23. Other shapes could also be used for the interconnecting member 22. As can be seen in FIG. 2, the interconnecting member 22 is formed with a hollow purge gas-receiving interior 24 and a gas-diffusing sidewall 26. The gas-diffusing sidewall 26, which defines the lateral extent of the gas-receiving interior 24, allows a pressurized purge gas in the gas-receiving interior to pass through the sidewall and exit therefrom in a diffused state into the weld zone 4, which is external to the interconnecting member 22. The longitudinal extent of the gas-receiving interior 24 is defined by the primary air flow blocking members 18 and 20, which are shown as capping the ends of the interconnecting member 22. In this embodiment, the interconnecting member 22 extends through central portions of the secondary air flow blocking members 18A and 20A, which may be suitably attached to the interconnecting member's sidewall 26 (e.g. using a water degradable adhesive). In an alternative configuration, not shown, the gas-receiving interior 24 could be terminated at the secondary blocking members 18A and 20A by blocking the gas-receiving interior at these locations. The remaining outboard portions of the interconnecting member 22 could then be open-ended proximate to the primary blocking members 18 and 20.

An external purge gas entry port in fluid communication with the gas-receiving interior may 24 be provided at a suitable location on the purge dam apparatus 2. One possible location is on the interconnecting member 22, as shown by gas entry port 28A formed in the heat shield 23. Another possible location is on one of the primary air flow blocking members 18 or 20, as shown by gas entry port 28B formed in the primary blocking member 20.

The various air flow blocking members 18, 18A, 20 and 20A may be constructed in any suitable configuration that can maintain purge gas within the weld zone 4 and prevent ambient air from entering the weld zone from within the pipes 8 and 10. In the illustrated embodiment of FIGS. 1 and 2, the air flow blocking members 18, 18A, 20 and 20A have a generally plate-like configuration. More particularly, each blocking member 18, 18A, 20 and 20A includes one or more generally circular disks 30, with at least one of the disks serving as a friction plate member having a plurality of flexible members 32 on its periphery, and with any remaining disks of a given blocking member serving as support plate members to provide structural rigidity. An example of this construction is illustrated in commonly owned U.S. Pat. No. 8,540,137, the contents of which are hereby incorporated herein by this reference.

As may be seen in FIG. 2, the flexible members 32 are adapted to flexibly engage an inside wall 8A or 10A of the pipes 8 or 10, proximate to the first or second pipe ends 12 or 14, such that the purge dam apparatus 2 is self-retaining in the pipe assembly 6. As used herein, the term "self-retaining" refers to the fact that no external retention components or materials, such as adhesive tape, glue, fasteners, etc., are required to retain the purge dam apparatus 2 in engagement with the pipe end inside walls. The self-retention property of the purge dam 2 apparatus is due to two factors. First, the diameter of the disk 30 that serves as the friction plate member is somewhat larger than the inside diameter of the pipes 8 and 10. This forces the free ends of the flexible members 32 to bend when the purge dam apparatus 2 is installed. Second, the flexible members 32, as well as the remainder of the disks 30 of a given air flow blocking member 18, 18A, 20 or 20A, are sufficiently stiff to develop radial forces between the flexible members 32 and the pipe inside walls 8A and 10A as the flexible members bend during purge dam installation. These radial forces in turn create longitudinal friction forces along the pipe inside walls 8A and 10A that oppose air or purge gas pressures that might otherwise displace the purge dam apparatus 2 in the longitudinal direction within the pipe ends 12 and 14.

The flexible members 32 may be formed in various ways. In the illustrated embodiment of FIGS. 1 and 2, they comprise flexible finger-shaped tabs defined by slits in the friction plate member periphery. The slits may be formed using any suitable technique, such as die cutting. Preferably, there are no appreciable gaps between the flexible members 32, such that bending the flexible members during purge dam installation does not allow an appreciable amount of purge gas to leave the weld zone 4 or air to enter the weld zone from within the pipes 8 and 10. It will be appreciated that other types of flexible members 32 may also be used. If desired, supportive spacer members 33 may be provided between the blocking members 18/18A and 20/20A. The spacer members 33 provide longitudinal support for the blocking members 18/18A and 20/20A, which may be beneficial if the purge dam apparatus 2 is designed for large diameter pipes. As shown in FIG. 3, the spacer members may have a rectangular box-like configuration, with other configurations also being possible.

As can be seen in FIG. 2, the purge dam apparatus 2 is installable in the pipe assembly 6 such that the first air flow blocking member 18 is arranged inside the first pipe end 18, the second air flow blocking member 20 is arranged inside the second pipe end 14, and the interconnecting member 22 spans the root gap 16. In this arrangement, the air flow blocking members 18 and 20 respectively engage the pipe inside walls 8A and 10A in order to retain a purge gas in the weld zone 4 and prevent air from entering the weld zone from within the pipes 8 and 10. The external gas entry port (e.g., 28A or 28B) is accessible to receive a purge gas dispensing tip 29 (see FIGS. 7A and 7B) that delivers a purge gas into the gas-receiving interior 24 of the interconnecting member 22 for passage through the gas diffusing sidewall 26 and into the weld zone 4 in a diffused state. Because the purge dam apparatus 2 includes one or more water degradable materials, it can be flushed from the pipe assembly following welding.

In an example embodiment, the gas-diffusing sidewall 26 may include a plurality of gas-permeable apertures 27 that each extend through the entire thickness of the sidewall. The gas-permeable apertures 27 may be of any desired shape, size and number. FIG. 1 illustrates circular aperture shapes, but this is for purposes of illustration only. Other aperture shapes, including elongated or slotted configurations, could also be used. By way of further example, if the interconnecting member 26 was to be formed with a fabric, fibrous or mesh-like material layer in its sidewall construction, the gas-permeable apertures 27 could have random, non-uniform shapes. As mentioned, the size and number of gas-permeable apertures 27 are also variable. These parameters may be selected according to various design considerations, such as the maximum acceptable level of weld zone turbulence, taking into account such factors as the pressure of the incoming purge gas, the size of the weld zone 4, the maximum acceptable purge time, etc.

The gas-permeable apertures 27 may be disposed randomly on the gas-diffusing sidewall 26, or alternatively, may be arranged in defined pattern. For example, the defined pattern may include the gas-permeable apertures 27 being arranged to allow the purge gas to exit from the interconnecting member in one or more desired directions.

Figure 3A:
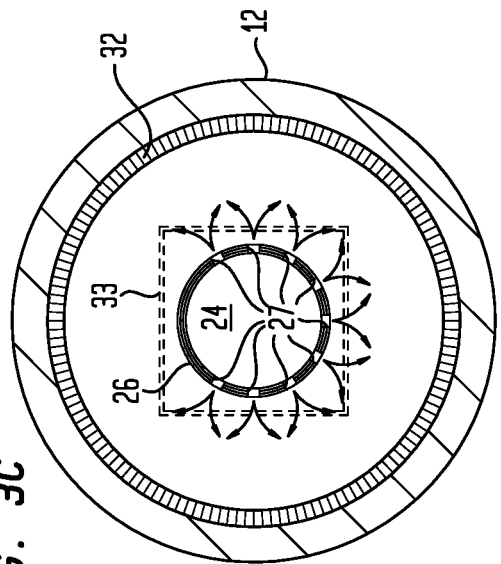
FIG. 3A is a cross-sectional view taken along line 3-3 in FIG. 2 showing an embodiment with an example arrangement of gas-permeable apertures.
Figure 3C:
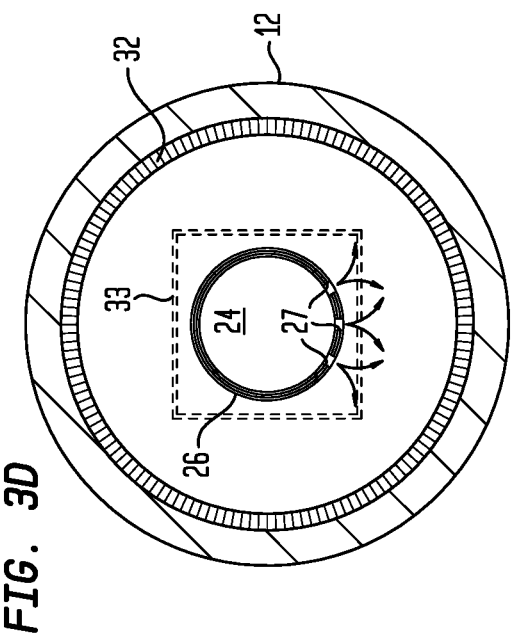
FIG. 3C is a cross-sectional view taken along line 3-3 in FIG. 2 showing an alternative embodiment having another modified arrangement of gas-permeable apertures.
Figure 3B:
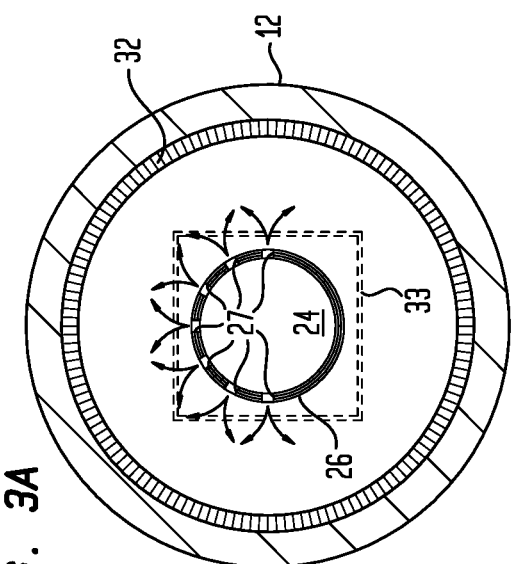
FIG. 3B is a cross-sectional view taken along line 3-3 in FIG. 2 showing an alternative embodiment having a modified arrangement of gas-permeable apertures.

This is shown in FIGS. 1 and 3A, which illustrate an embodiment wherein the interconnecting member is generally tubular and the gas-permeable apertures 27 are arranged to allow purge gas to exit from the gas-receiving interior 24 in an upward direction within a prescribed circumferential angular extent, namely 180 degrees. FIG. 3B illustrates an alternative embodiment in which the gas-permeable apertures 27 are arranged to allow purge gas to exit from the gas-receiving interior 24 in a downward direction within a prescribed circumferential extent of 180 degrees. In other embodiments (not shown), the gas-permeable apertures 27 could be arranged to allow purge gas to exit from the gas-receiving interior 24 in other directions.

Figure 3D:
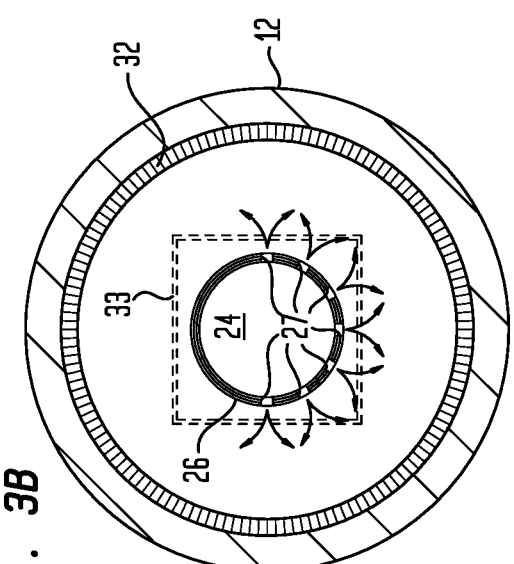
FIG. 3D is a cross-sectional view taken along line 3-3 in FIG. 2 showing an alternative embodiment having another modified arrangement of gas-permeable apertures.

It will be appreciated that the gas-permeable apertures 27 may arranged to span any desired circumferential angular extent of an exterior surface of the interconnecting member's sidewall 26, such as 45 degrees, 90 degrees, 180 degrees, 270 degrees, etc. A 180 degree aperture configuration happens to be shown in FIGS. 1, 3A and 3B, but this is for purposes of illustration only. FIG. 3C illustrates an alternative embodiment in which the gas-permeable apertures are arranged to allow purge gas to exit from the gas-receiving interior 24 within a prescribed circumferential extent of 270 degrees. FIG. 3D illustrates another alternative embodiment in which the gas-permeable apertures are arranged to allow purge gas to exit from the gas-receiving interior 24 within a prescribed circumferential extent of 45 degrees. As discussed below in connection FIG. 8, the gas-permeable apertures 27 may also be arranged to span any desired longitudinal extent of the interconnecting member 22.

As can be seen in FIG. 1, an example aperture pattern may be provided by arranging the gas-permeable apertures 27 on the interconnecting member 22 as a set of spaced circumferential arrays, with each array forming an arc having a defined number of apertures extending over the desired angular range. Non-direction specific patterns of gas-permeable apertures 27 could also be used, such as a 360 degree pattern. For example, a 360 degree aperture pattern could be provided by a set of spaced circumferential arrays, with each array having a full circle arrangement of apertures.

With additional reference now to FIG. 4, an embodiment of the purge dam apparatus is shown that includes discrete first and second purge dam subassemblies 40 and 42 that may be separately installed in the first and second pipe ends 12 and 14 during purge dam formation.

The first purge dam subassembly 40 includes the primary and secondary air flow blocking members 18 and 18A, and a first generally tubular conduit 22A that provides a first component of the interconnecting member 22. The first conduit 22A has a hollow interior 24A providing a first region of the interconnecting member's gas-receiving interior 24. As shown in FIG. 2, the first conduit 22A has a closed end 22A-1 (the outboard end) proximate to the primary blocking member 18 and an open free end 22A-2 (the inboard end) disposed distally from the blocking member 18. Alternatively, the first conduit 22A could be closed proximate to the secondary blocking member 18A if it was desired to terminate the gas-receiving interior 24A at that location.

The second purge dam subassembly 42 includes the primary and secondary air flow blocking members 20 and 20A, and a second generally tubular conduit 22B that provides a second component of the interconnecting member 22. The second conduit 22B has a hollow interior 24B providing a second region of the interconnecting member's gas-receiving interior 24. As shown in FIG. 2, the second conduit 22B has a closed end 22B-1 (the outboard end) proximate to the primary blocking member 20 and an open free end (the inboard end) 22B-2 disposed distally from the blocking member 20. Alternatively, the second conduit 22B could be closed proximate to the secondary blocking member 20A if it was desired to terminate the gas-receiving interior 24B at that location.

The first and second conduits 22A and 22B include respective gas diffusing sidewalls 26A and 26B that collectively form the gas diffusing sidewall 26 of the interconnecting member 22. The gas-diffusing sidewalls 26A and 26B thus allow a pressurized purge gas in the hollow interiors 24A and 24B of the first and second conduits 22A and 22B to pass through the sidewalls and exit therefrom in a diffused state to the area of the weld zone 4 that is external to the interconnecting member 22.

The water-degradable ceramic heat shield 23 represents a third generally tubular conduit in the embodiment of FIG. 4 that provides a third portion of the interconnecting member 22. The heat shield 23 has a first open end 23A that is interconnectable with the open end 22A-2 of the first conduit 22A, and a second open end 23B that is interconnectable with the open end 22B-2 of the second conduit 22B.

The above-discussed external gas entry ports (28A or 28B) are accessible to receive a purge gas dispensing tip that delivers a purge gas into the hollow interiors 24A and 24B of the first and second conduits 22A and 22B for passage through the gas diffusing sidewalls 26A and 26B into the weld zone 4 in a diffused state.

If desired, the first, second and third conduits 22A, 22B and (heat shield) 23 may be configured to allow a spacing between the first and second purge dam subassemblies 40 and 42 to be adjusted during installation of the welding purge dam apparatus 2 in the pipe assembly 6. This will allow the spacing between the pipe ends 12 and 14 to be adjusted once the purge dam apparatus 2 is installed in the pipe assembly 6 as the root gap 16 is established. An adjustable spacing configuration may be realized by sizing the first and second conduits 22A and 22B so as to be slidably insertable into the first and second ends 23A and 23B of the heat shield 23. The length of the heat shield may be selected to allow a desired range of slidable adjustment capability.

Figure 5:
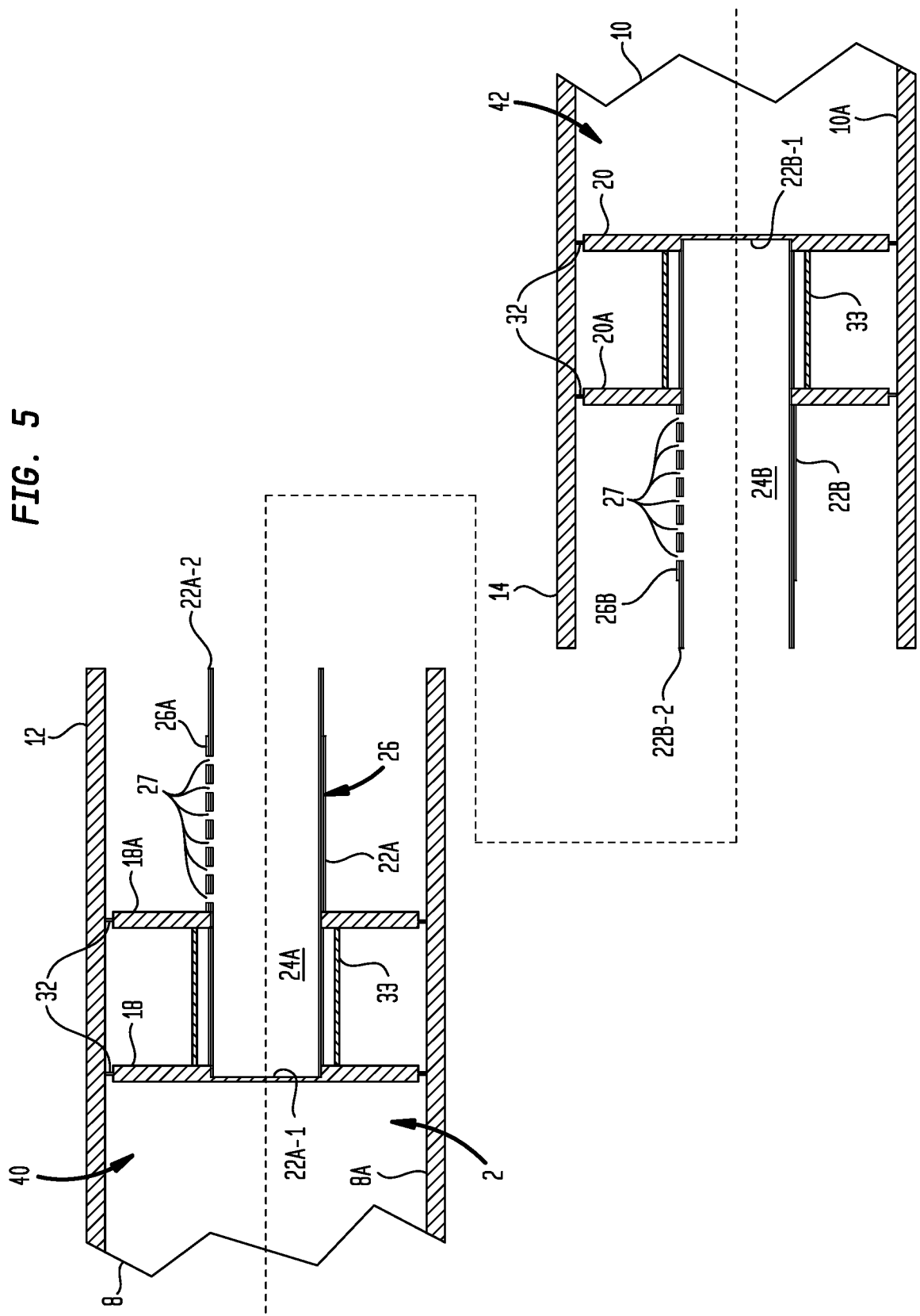
FIG. 5 is a cross-sectional centerline view of the purge dam apparatus of FIG. 1 during a first stage of installation in a pipe assembly.

Installation of the purge dam apparatus 2 in the pipe assembly 6 according to the embodiment of FIG. 4 may be performed using the installation method now to be described. As shown in FIG. 5, the pipes 8 and 10 may be initially separated a considerable distance so that the purge dam subassemblies 18 and 30 may be separately introduced into the pipe ends 12 and 14. Note that the blocking members 18/18A and 20/20A may fit sufficiently tightly within the pipe ends 12 and 14, respectively, so as to require that the purge dam subassemblies 18 and 30 be pounded into the pipe ends by applying a striking force against the inboard ends 22A-2 and 22B-2 of the first and second conduits 22A and 22B. The purge dam subassemblies 40 and 42 are preferably positioned so that the inboard ends 22A-2 and 22B-2 do not extend substantially beyond the pipe ends 12 and 14, respectively. Otherwise, it may not be possible to bring the pipe ends 12 and 14 close enough together to form the root gap 16.

Figure 6:
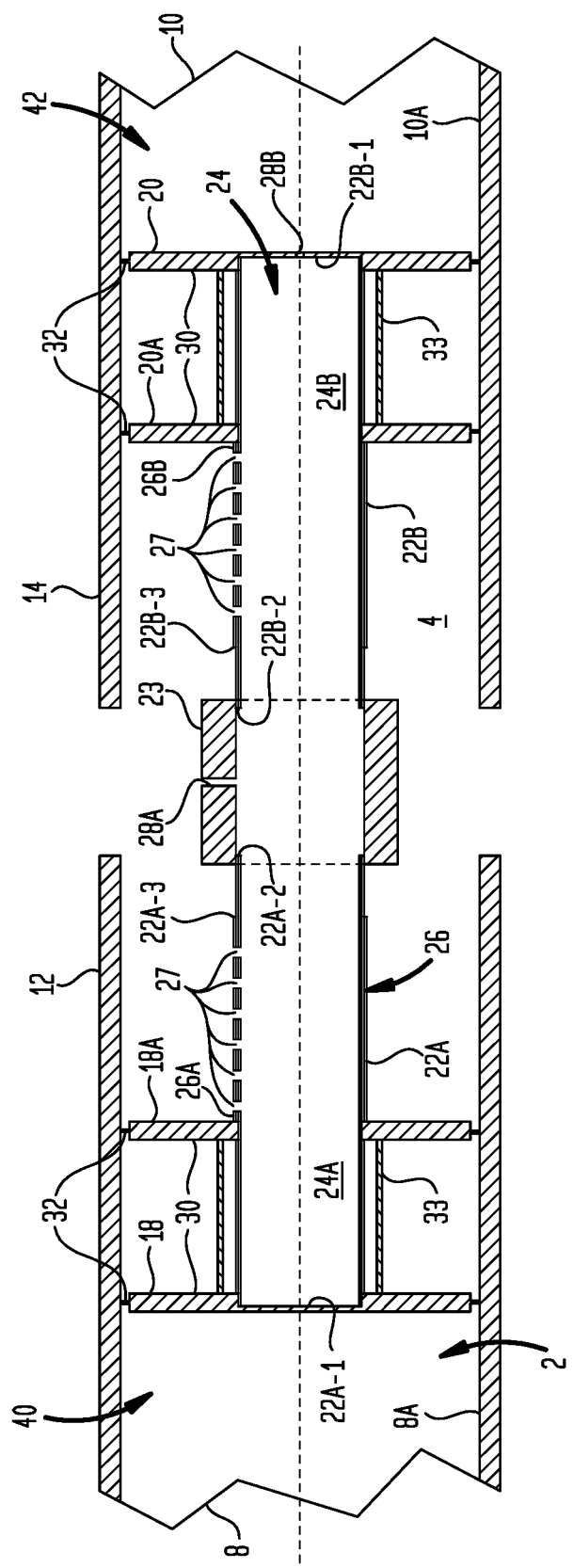
FIG. 6 is a cross-sectional centerline view of the purge dam apparatus of FIG. 1 during a second stage of installation in a pipe assembly.

Once the purge dam subassemblies 40 and 42 are respectively installed in the pipe ends 12 and 14, the pipe ends may be brought closer together toward the spacing position shown in FIG. 6. At a certain spacing position, it will be possible to slide the respective ends 23A and 23B of the heat shield 23 onto the inboard ends 22A-2 and 22B-2 of the first and second conduits 22A and 22B. Following this operation, the pipe ends 12 and 14 may be brought still closer together into the weld zone purging installation configuration of FIG. 2, in which the weld zone 4 and root gap 16 are formed and the weld zone is ready for purging.

As can be seen in FIG. 6, shoulders 22A-3 and 22B-3 may be respectively formed near the inboard ends 22A-2 and 22B-2 of the first and second conduits 22A and 22B. The shoulders 22A-3 and 22B-3 serve as stops that engage the ends of the heat shield 23 as the pipe ends 12 and 14 are brought together, preventing further inboard movement of the first and second conduits 22A and 22B. The location of the shoulders 22A-3 and 22B-3 is selected to provide a desired gap between the inboard ends 22A-2 and 22B-2 of the first and second conduits 22A and 22B when the pipe ends 12 and 14 are spaced for welding as shown in FIG. 2. This gap aligns with the purge gas entry port 28A that extends through the heat shield 23, and effectively forms an extension thereof. In the illustrated embodiment, the shoulders 22A-3 and 22B-3 are formed by providing increased diameter sections on the first and second conduits 22A and 22B. In FIG. 6, these increased diameter sections are shown to extend from the shoulders 22A-3 and 22B-3 to the secondary blocking members 18A and 20A, respectively.

Figure 7A:
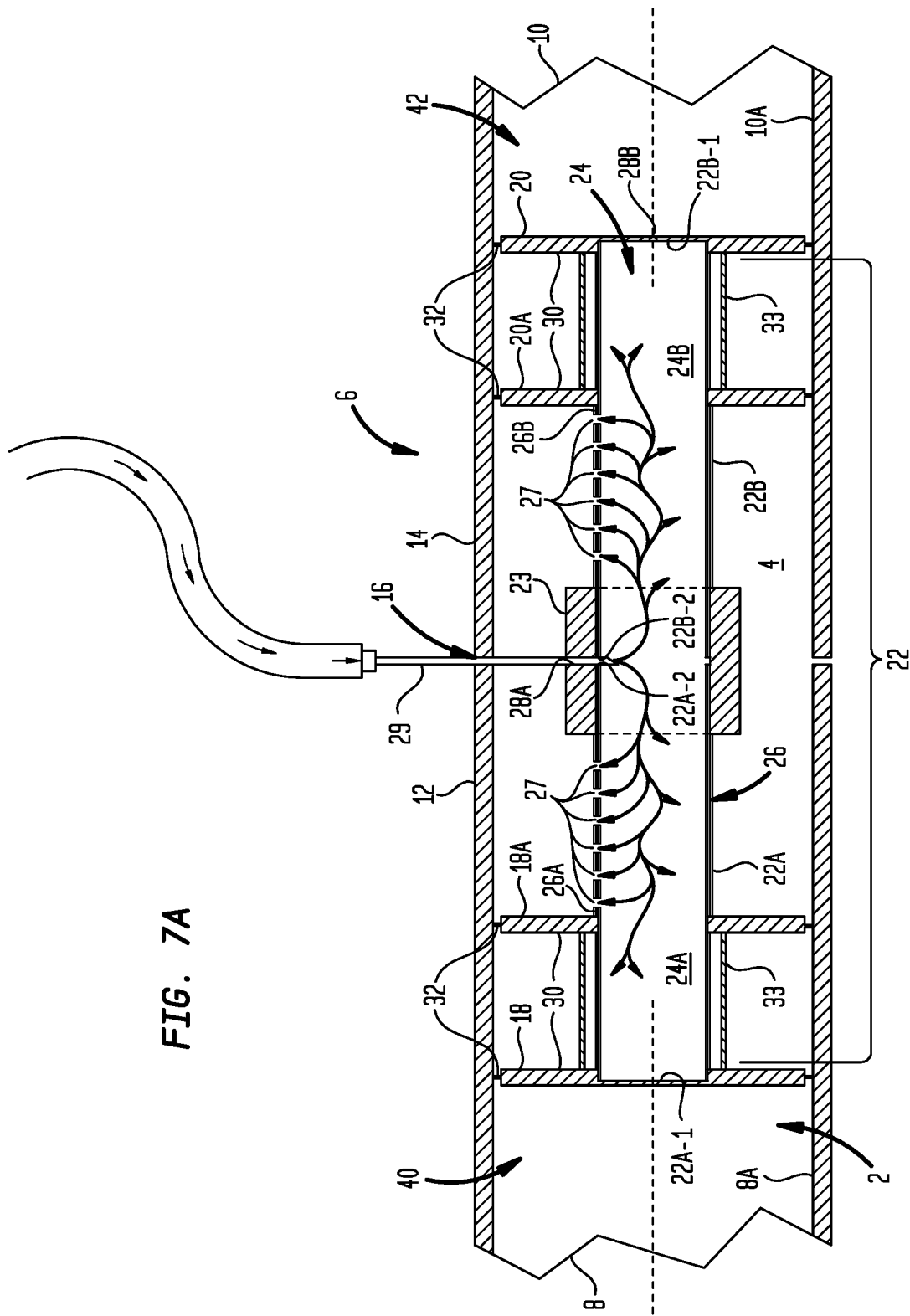
FIG. 7A is a cross-sectional centerline view of the purge dam apparatus of FIG. 1 following installation in a pipe assembly and with an external purge dam entry port of the purge dam apparatus provided at a first location.
Figure 7B:
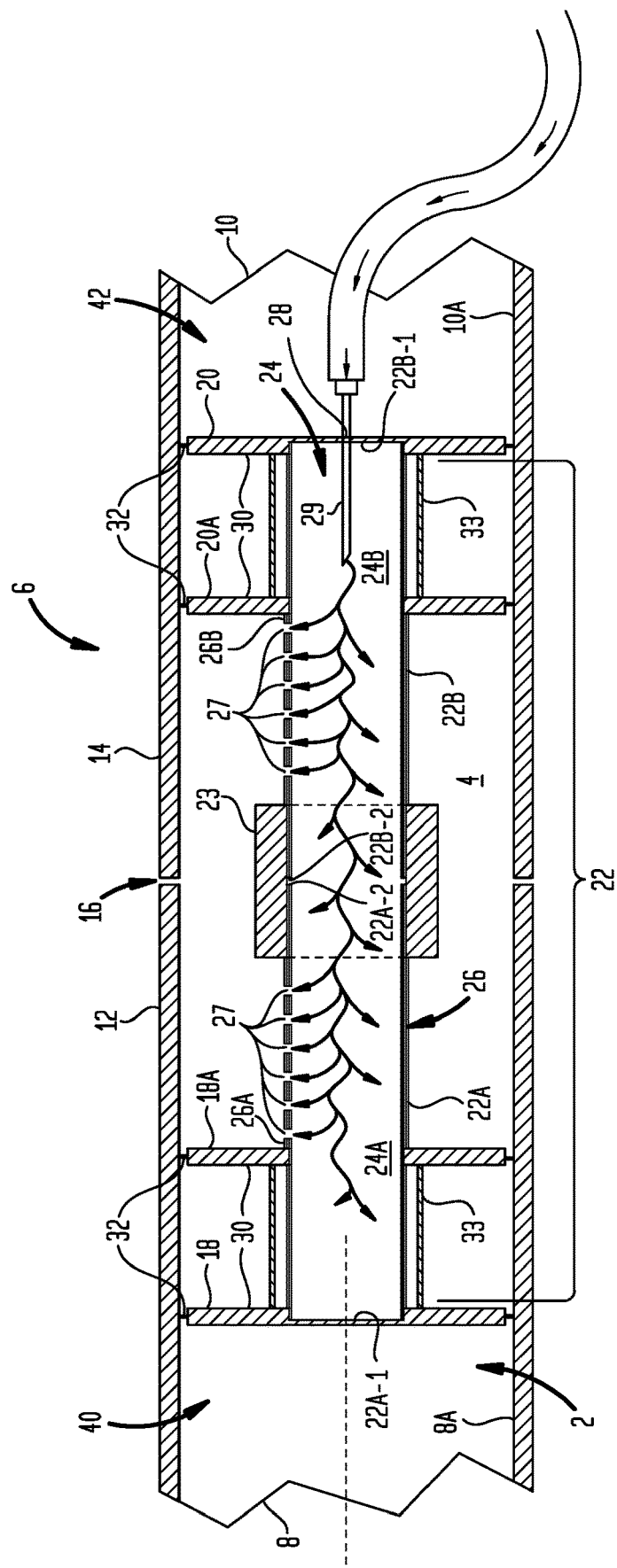
FIG. 7B is a cross-sectional centerline view the purge dam apparatus of FIG. 1 following installation in a pipe assembly and with an external purge dam entry port of the purge dam apparatus provided at a second location.

As previously noted, purge gas may be introduced into the purge gas-receiving interior 24 of the interconnecting member 22, and thereafter enter the weld zone 4 in a diffused state through the interconnecting member's gas-diffusing sidewall 26. FIGS. 7A and 7B show two example purging techniques. In FIG. 7A, the purge dam apparatus 2 is provided with the purge gas entry port 28A located on the heat shield 23. According to this technique, the purge gas dispensing tip 29 is advanced through the root gap 16 of the pipe assembly 6 and inserted through the purge gas entry port 28A into the interior of the interconnecting member 22. In FIG. 7B, the purge dam apparatus 2 is provided with the purge gas entry port 28B located on the primary blocking member 20 (or alternatively on the primary blocking member 18). According to this technique, the purge gas dispensing tip 29 is advanced through the interior of a corresponding one of the pipes 8 or 10 of the pipe assembly 6 (e.g., from a remote open end of the pipe, from an open pipe junction, etc.) and inserted through the purge gas entry port 28B into the interior of the interconnecting member 22.

Once the pipe ends 12 and 14 are fully welded together at the root gap 16, the purge dam apparatus 2 may be conveniently removed from the pipe assembly 6 using an aqueous fluid that is passed through the pipes 8 and 10. For example, the pipe assembly 6 may be flushed with water to degrade the purge dam assembly 2, so that it breaks apart and flows along the newly formed pipe run to an exit point, which is typically a non-welded end of one of the pipes 8 or 10 (or other egress point). For some water-degradable materials, such as water soluble paper and/or polymer laminates, the purge dam assembly 2 may completely dissolve as a result of such flushing. For other water-degradable materials, the purge dam assembly 2 may partially dissolve as a result of the flushing, with any remaining solids being washed away by the aqueous fluid.

Figure 8:
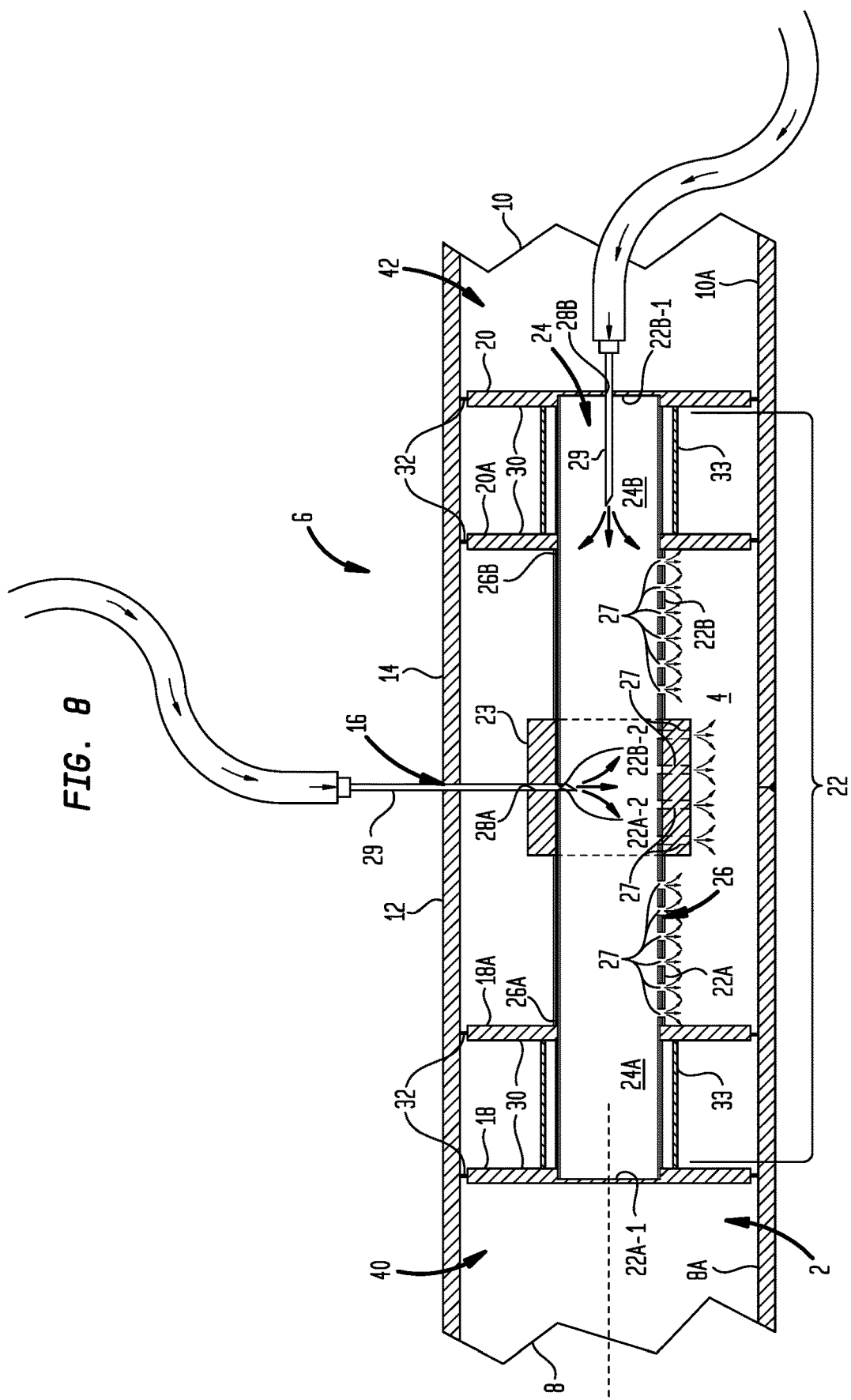
FIG. 8 is a cross-sectional centerline view of the purge dam apparatus of FIG. 1 following installation in a pipe assembly and illustrating a modification that provides additional gas-permeable apertures.

Turning now to FIG. 8, a modified version of the purge dam apparatus 2 of FIG. 1 is shown installed in the pipe assembly 6. This alternative embodiment of the purge dam apparatus 2 is characterized by the addition of gas-permeable apertures 27 extending through the sidewall of the heat shield 23, thereby increasing the longitudinal extent of the aperture pattern. It should also be mentioned that the longitudinal extent of the gas-permeable apertures 27, in this or any of the previous embodiments, could be decreased if so desired. For example, FIG. 8 (as well as FIGS. 1-7B) shows the aperture pattern on each of the first and second conduits 22A and 22B respectively extending substantially to the secondary blocking members 18A and 20A. In an alternative embodiment (not shown), the aperture pattern could be terminated further from the secondary blocking members 18A and 20A, i.e., at more inboard locations. It would also be possible to form the gas-permeable apertures 27 in one of the first and second conduits 22A and 22B, but not the other. Another option would be to form the gas-permeable apertures 27 in the heat shield 23 only, and not in either of the first or second conduits 22A or 22B, or in the heat shield 23 and in only one of the first or second conduits.

Accordingly, a gas-diffusing water-degradable purge dam apparatus, together with a related method and a weld zone purging installation, have been disclosed. While various embodiments have been described, it should be apparent that many variations and alternative embodiments could be implemented in accordance with the invention. It is understood, therefore, that the invention is not to be in any way limited except in accordance with the spirit of the appended claims and their equivalents.

What is claimed is:

1. A gas-diffusing water-degradable welding purge dam apparatus for purging a weld zone of a pipe assembly having first and second pipes with respective first and second pipe ends to be welded together at a root gap, said purge dam apparatus comprising:
   a first air flow blocking member;
   a second air flow blocking member;
   an interconnecting member interconnecting said first and second air flow blocking members;
   said interconnecting member having a hollow purge gas-receiving interior extending between gas-impermeable closures on said interconnecting member, and a gas-diffusing sidewall comprising gas-permeable apertures that allow a pressurized purge gas in said gas-receiving interior to pass through said sidewall and exit therefrom in a diffused state to a weld zone area external to said interconnecting member;
   an external purge gas entry port in said purge dam apparatus in fluid communication with said gas-receiving interior;
   said purge dam apparatus being installable in said pipe assembly such that:
   (1) said first air flow blocking member is arranged inside said first pipe end, said second air flow blocking member is arranged inside said second pipe end, and said interconnecting member spans said root gap;
   (2) said air flow blocking members respectively engage inside walls of said first and second pipe ends in order to retain a purge gas in said weld zone and to prevent air from entering said weld zone from said first and second pipes; and
   (3) said external gas entry port is accessible to receive a purge gas dispensing tip that delivers said purge gas into said gas-receiving interior for passage through said gas diffusing sidewall and into said weld zone in said diffused state; and said purge dam apparatus comprising one or more water degradable materials so as to be flushable from said pipe assembly following welding.

2. The purge dam apparatus of claim 1, wherein said gas-diffusing sidewall comprises said gas-permeable apertures being of any desired shape, size and number.

3. The purge dam apparatus of claim 2, wherein said gas-permeable apertures are arranged in a defined pattern.

4. The purge dam apparatus of claim 3, wherein said defined pattern comprises said gas-permeable apertures being arranged to allow said purge gas to exit from said interconnecting member in one or more desired directions.

5. The purge dam apparatus of claim 4, wherein said interconnecting member is generally tubular and said gas-permeable apertures are arranged to allow said purge gas to exit from said interconnecting member within a prescribed circumferential angular extent of an exterior surface of said interconnecting member.

6. The purge dam apparatus of claim 4, wherein said interconnecting member is generally tubular and said gas-permeable apertures are arranged in circumferential arrays on said interconnecting member.

7. The purge dam apparatus of claim 1, wherein said external purge gas entry port is located on said interconnecting member or on one of said first and second blocking members.

8. The purge dam apparatus of claim 1, wherein said purge dam apparatus comprises:
  a first purge dam subassembly that includes said first blocking member and a first conduit that provides a first portion of said interconnecting member, said first conduit having a hollow interior, a closed end proximate to said first blocking member and an open end disposed distally from said first blocking member;
  a second purge dam subassembly that includes said second blocking member and a second conduit that provides a second portion of said interconnecting member, said second conduit having a hollow interior, a closed end proximate to said second blocking member and an open end disposed distally from said second blocking member;
  a third conduit that provides a third portion of said interconnecting member and has a first open end interconnectable with said open end of said first conduit and a second open end interconnectable with said open end of said second conduit;
  one or more of said first, second and third conduits having gas diffusing sidewalls comprising said gas-permeable apertures that allow said pressurized purge gas in said hollow interiors of said first, second or third conduits to pass through said sidewalls and exit therefrom in said diffused state to said weld zone; and
  said external gas entry port is accessible to receive said purge gas dispensing tip that delivers said purge gas into said hollow interiors of said first, second and third conduits for passage through said gas diffusing sidewalls and into said weld zone in said diffused state.

9. The purge dam apparatus of claim 8, wherein said first, second and third conduits are configured to allow a spacing between said first and second purge dam subassemblies to be adjusted during installation of said welding purge dam apparatus in said pipe assembly.

10. The purge dam apparatus of claim 8, wherein said third conduit comprises a ceramic heat shield.

11. A gas-diffusing water-degradable welding purge dam apparatus for purging a weld zone of a pipe assembly having first and second pipes with respective first and second ends to be welded together at a root gap, said purge dam apparatus comprising:
  a first purge dam subassembly having a first conduit with a hollow gas-receiving interior, a first open end and a closed second end, and further having one or more air flow blocking plates fixedly mounted on said first conduit;
  a second purge dam subassembly having a second conduit with a hollow gas-receiving interior, a first open end and a closed second end, and further having one or more air flow blocking plates fixedly mounted on said second conduit;
  a hollow third conduit having a first open end interconnectable with said open end of said first conduit and a second open end interconnectable with said open end of said second conduit;
  one or more of said first, second and third conduits having gas-diffusing sidewalls comprising gas-permeable apertures that allow a pressurized purge gas in said hollow gas-receiving interiors of said first, second or third conduits to pass through said sidewalls and enter an area external to said first and second conduits in a diffused state;
  an external purge gas entry port in said purge dam apparatus in fluid communication with said hollow gas-receiving interiors of said first and second conduits;
  said purge dam apparatus being installable in said pipe assembly such that:
    (1) said first purge dam subassembly is arranged inside said first pipe end, said second purge dam subassembly is arranged inside said second pipe end, and said third conduit is interconnected to said first and second conduit and spans said root gap;
    (2) said one or more blocking plates of said first and second purge dam assemblies respectively engage inside walls of said first and second pipe ends in order to retain a purge gas in said weld zone and to prevent air from entering said weld zone from said first and second pipes; and
    (3) said external gas entry port is accessible to receive a purge gas dispensing tip that delivers said purge gas into said hollow gas-receiving interiors of said first, second and third conduits for passage through said gas diffusing sidewalls and into said weld zone in said diffused state; and
  said purge dam apparatus comprising one or more water degradable materials so as to be flushable from said pipe assembly following welding.

12. The purge dam apparatus of claim 11, wherein said gas-diffusing sidewalls comprise said gas-permeable apertures being of any desired shape, size and number.

13. The purge dam apparatus of claim 12, wherein said gas-permeable apertures are arranged in defined pattern.

14. The purge dam apparatus of claim 13, wherein said defined pattern comprises said gas-permeable apertures being arranged to allow said purge gas to exit from said first, second or third conduits in one or more desired directions.

15. The purge dam apparatus of claim 14, wherein said first, second and third conduits are generally tubular and said gas-permeable apertures are arranged to allow said purge gas to exit from said first, second or third conduits within a prescribed circumferential angular extent of an exterior surface said first, second or third conduits.

16. The purge dam apparatus of claim 14, wherein said first, second and third conduits are generally tubular and said gas-permeable apertures are arranged in circumferential arrays on said first, second or third conduits.

17. The purge dam apparatus of claim 11, wherein said external purge gas entry port is located on said third conduit or on one of said first and second blocking members.

18. The purge dam apparatus of claim 11, wherein said first, second and third conduits are configured to allow a spacing between said first and second purge dam subassemblies to be adjusted during installation of said welding purge dam apparatus in said pipe assembly.

19. The purge dam apparatus of claim 11, wherein said third conduit comprises a ceramic heat shield.

20. A method for installing a water-degradable purge dam apparatus in a weld zone of a pipe assembly having first and second pipes with respective first and second pipe ends to be welded together at a root gap, said method comprising:
   providing a water-degradable purge dam, comprising:
   a first air flow blocking member;
   a second air flow blocking member;
   an interconnecting member interconnecting said first and second air flow blocking members;
   said interconnecting member having a hollow purge gas-receiving interior extending between gas-impermeable closures on said interconnecting member, and a gas-diffusing sidewall comprising gas-permeable apertures that allow a pressurized purge gas in said gas-receiving interior to pass through said sidewall and exit therefrom in a diffused state to a weld zone area external to said interconnecting member;
   an external purge gas entry port in said purge dam apparatus in fluid communication with said gas-receiving interior; and
   said purge dam apparatus comprising one or more water degradable materials so as to be flushable from said pipe assembly following welding;
   installing said purge dam apparatus in said pipe assembly such that:
   (1) said first air flow blocking member is arranged inside said first pipe end, said second air flow blocking member is arranged inside said second pipe end, and said interconnecting member spans said root gap;
   (2) said air flow blocking members respectively engage inside walls of said first and second pipe ends in order to retain a purge gas in said weld zone and to prevent air from entering said weld zone from said first and second pipes; and
   (3) said external gas entry port is accessible to receive a purge gas dispensing tip that delivers said purge gas into said gas-receiving interior for passage through said gas diffusing sidewall and into said weld zone in said diffused state.

21. A weld zone purging installation for purging a weld zone of a pipe assembly having first and second pipes with respective first and second pipe ends to be welded together at a root gap, said purging installation comprising:
   said pipe assembly including said said first pipe and said second pipe;
   said first pipe end and said second pipe end being spaced from each other to form said root gap;
   a water-degradable purge dam apparatus including:
   a first air flow blocking member;
   a second air flow blocking member;
   an interconnecting member interconnecting said first and second air flow blocking members;
   said interconnecting member having a hollow purge gas-receiving interior extending between gas-impermeable closures on said interconnecting member, and a gas-diffusing sidewall comprising gas-permeable apertures that allow a pressurized purge gas in said gas-receiving interior to pass through said sidewall and exit therefrom in a diffused state to a weld zone area external to said interconnecting member;
   an external purge gas entry port in said purge dam apparatus in fluid communication with said gas-receiving interior; and
   said purge dam apparatus comprising one or more water degradable materials so as to be flushable from said pipe assembly following welding;
   said purge dam apparatus being installed in said pipe assembly such that:
   (1) said first air flow blocking member is arranged inside said first pipe end, said second air flow blocking member is arranged inside said second pipe end, and said interconnecting member spans said root gap;
   (2) said air flow blocking members respectively engage inside walls of said first and second pipe ends in order to retain a purge gas in said weld zone and to prevent air from entering said weld zone from said first and second pipes; and
   (3) said external gas entry port is accessible to receive a purge gas dispensing tip that delivers said purge gas into said gas-receiving interior for passage through said gas diffusing sidewall and into said weld zone in said diffused state.

* * * * *